Sept. 7, 1937.  N. H. F. OLSEN  2,092,291
MOTOR VEHICLE
Filed Dec. 2, 1935
Fig. 1.
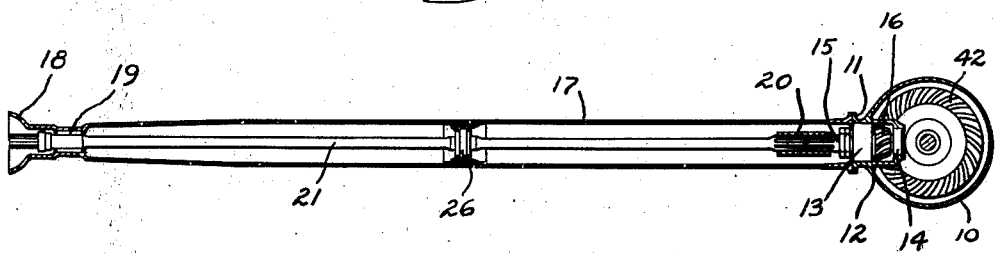
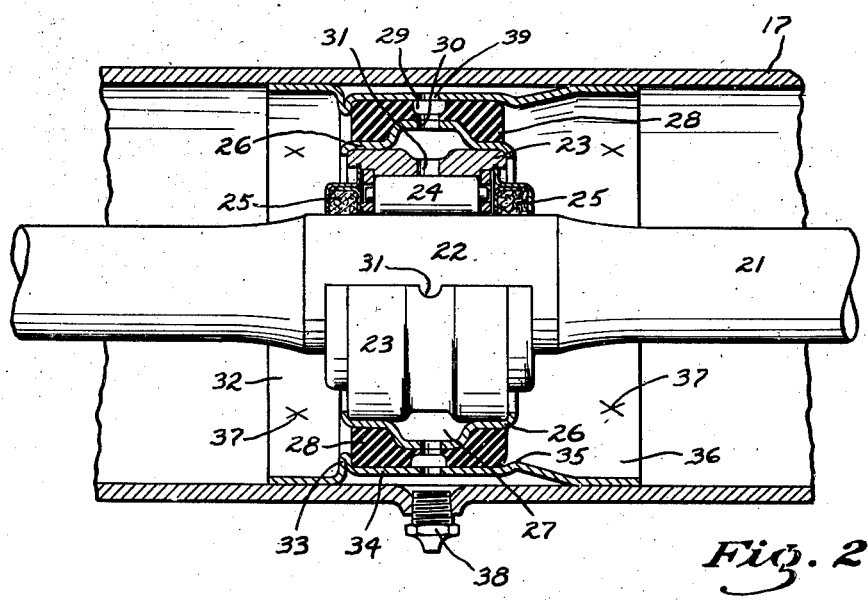
Fig. 2.
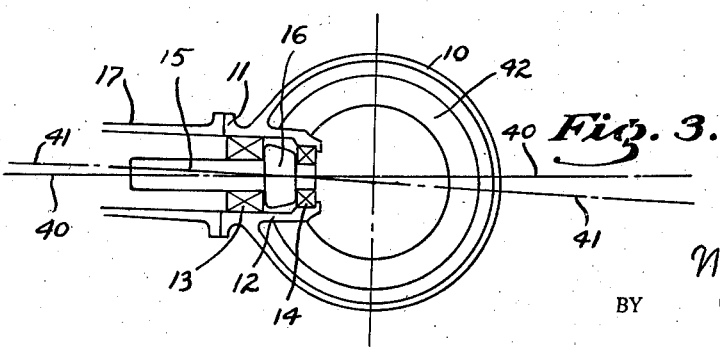
Fig. 3.
W. Colvin C. McRae
INVENTOR.
N. H. F. Olsen
BY
ATTORNEY.

Patented Sept. 7, 1937

2,092,291

UNITED STATES PATENT OFFICE 2,092,291

MOTOR VEHICLE

Niels H. F. Olsen, Dearborn, Mich., assignor to Ford Motor Company, Dearborn, Mich., a corporation of Delaware Application December 2, 1935, Serial No. 52,588

5 Claims. (Cl. 308—184)

The object of my invention is to provide improvements in automotive vehicles which employ a torque tube drive, which improvements contribute to the quietness of operation of such vehicles.

My improved device comprises a torque tube having a relatively small solid drive shaft rotatably mounted therein, the forward end of the drive shaft being connected by means of a universal joint with the transmission of the vehicle while the rear end of the drive shaft is secured to the rear axle driving pinion. The unique feature of this device is that the center portion of the shaft as well as the ends thereof are rotatably supported within the torque tube upon specially designed bearings. By means of this construction increased torsional flexibility between the engine and the rear axle pinion is obtained while at the same time whipping of the drive shaft is eliminated. Perhaps the most important feature of this construction is that the drive shaft maintains its axial alignment in the torque tube even though the latter is deflected under load so that the rear axle driving pinion maintains its correct meshing engagement with the ring gear irrespective of deflections in the torque tube.

During recent years the trend in automobile design has been towards longer drive shafts, caused partly by increase in wheel base and partly because the engine has been placed forwardly over the front axle in many cars. Such longer drive shafts have had to be made stiffer to prevent whipping so that the former solid drive shaft is now obsolete. The increase in engine speeds now obtainable would in itself cause the abandonment of the old type solid drive shafts. Engine speeds up to 5000 R. P. M. are now quite common, and at such speeds a solid drive shaft of the length required will invariably whip. If the shaft is made larger, its torsional elasticity becomes nil so that practically all of the torsional vibration of the motor is transferred to the rear axle gearing.

As a compromise some car manufacturers have adopted a tubular construction which weighs only a fraction of the weight of a solid shaft having the same radius of gyration and consequently is much less subject to whipping at high speed. Such tubular shafts have the disadvantage that their torsional elasticity is very low and therefore absorb very little of the torsional vibration of the engine.

Other car manufacturers, desirous of retaining the advantages of the small solid type shaft, have installed what are known as coupling shafts between the front end of the torque tube and the rear end of the motor. This construction allows a short torque tube to be used so that both the coupling shaft and the drive shaft may be made solid and of small diameter. The disadvantage of this construction is that an extra universal joint and shaft housing are required which materially increase the cost of the drive.

The applicant's construction retains the torsional elasticity of the small solid drive shaft while preventing whipping at all available engine speeds, and accomplishes this result without coupling shafts or similar devices.

A further disadvantage of tubular drive shafts when used in conjunction with a torque tube drive is that excessive gear wear results, due to the bending of the torque tube and to the axial rigidity of the tubular shaft. In all torque tube drive cars, the function of the torque tube is to resist the torque applied to the driving wheels; that is, to prevent the rear axle housing from rotating rearwardly upon the engine torque being applied to the driving pinion. A further function is to prevent the forward rotation of the axle housing upon the application of the brakes. In spite of the extreme rigidity provided in present torque tubes it is impractical to provide a tube which will resist the driving torque without lateral deflection or bending through an appreciable amount. In a well known 1936 motor vehicle the torque tube when under load bends at the center point about $\frac{1}{16}$ of an inch so that the center of the tube is $\frac{1}{16}$ of an inch out of axial alignment with the end portions thereof. Upon the reversal of the torque, as when the brakes are applied, the torque tube of course bends in the opposite direction. Such torque tube, being about six feet long, is not excessively strained by a deflection of $\frac{1}{16}$ of an inch. However, where a tubular drive shaft is used, it will be apparent that such shaft will not bend to conform with the torque tube. The bearings which support the drive shaft at the ends of the tube distort sufficiently to allow the drive shaft to rotate upon a straight axis. When the torque tube is under load the drive shaft axis forms a cord which intersects the axis of the tube at the two supporting bearings. It is obvious that the axis of the drive shaft will not at such time pass through the axis of the ring gear and consequently, the ring gear and pinion will not be properly aligned under these conditions. Perhaps the most important function of my invention is that the torque tube and drive shaft are maintained in concentric relationship so that proper alignment between the ring gear and the pinion is maintained even though the torque tube bends through a considerable range.

With these and other objects in view, my invention consists in the arrangement, construction, and combination of the various parts of my improved device, as described in the specification, claimed in my claims, and illustrated in the accompanying drawing, in which:

Figure 1 is a vertical, central, sectional view showing my improved torque tube and drive shaft.

Figure 2 is a full sized longitudinal sectional view, taken through the center bearing of the torque tube shown in Figure 1, and Figure 3 is a diagrammatic view, illustrating, to an exaggerated amount, the pinion and ring gear misalignment unavoidable in the conventional construction.

Referring to the accompanying drawing, I have used the reference numeral 10 to indicate generally the differential and ring gear housing of a conventional automobile axle, in which housing a ring gear 42 is rotatably mounted. A tubular bearing sleeve 12 is formed integrally with one side of the housing 10 and a flange 11 is formed upon the outer end of the sleeve 12. A pair of spaced bearings 13 and 14, respectively, are mounted in the respective ends of the bearing sleeve 12, and a pinion shaft 15 is rotatably mounted in these bearings. A pinion 16 is formed integrally with the shaft 15, said pinion being disposed between the bearings 13 and 14 in position to mesh with the ring gear 42. The pinion 16 is thereby rotatably mounted in the housing 10 so as to be held in correct meshing engagement with the ring gear 42 independently of any other structure in the axle.

A torque tube 17 is provided, this tube having a flange on one end thereof which is fixedly secured to the flange 11 to form a continuation of the bearing sleeve 12. The usual length of the average automobile torque tube is between six and eight feet, the forward end of the tube terminating in a spherical member 18. The member 18 is universally mounted in the rear end of the vehicle transmission. A bearing 19 is secured in the forward end of the torque tube 17 adjacent to the spherical member 18.

It will be noted that the forward end of the pinion shaft 15 is splined and that a sleeve 20 is fixed thereon to drive the pinion shaft. The sleeve 20 is of course splined, the forward end of this sleeve receiving a splined portion on the rear end of the drive shaft. The drive shaft is given the reference numeral 21 and is formed of a solid steel shaft of relatively small diameter, the shaft extending from the sleeve 20 forwardly through the bearing 19 and terminating in a splined end portion which is adapted to be driven by the universal joint associated with the transmission of the vehicle. The drive shaft having a relatively small diameter has considerable torsional flexibility so that the torsional vibration of the motor will be absorbed before it is transferred to the driving pinion 16.

The center portion of the shaft 21 is provided with an enlarged bearing section 22, which section is adapted to be rotatably supported by the intermediate portion of the torque tube 17. In Figure 2 of the accompanying drawing, I have shown one type of bearing for supporting the intermediate section of the drive shaft; however, it will be understood that the specific details of this bearing are adapted to wide variations and that other forms of bearings may be employed without departing from the scope of this invention.

Referring to Figure 2, I have provided a bearing race 23 in which an annulus of rollers 24 is mounted, each end of this race being closed by means of a packing member 25. The rollers 24 roll upon the center bearing section 22 of the shaft, the packing members 25 also coacting with this section to form a seal for lubricant around the rollers. In order that the bearing race 23 may be non-rigidly secured within the center portion of the torque tube, I have provided a sleeve 26 in which the race 23 is secured, this sleeve having an enlarged center portion which forms a chamber 27 between the sleeve and the center portion of the race 23. The sleeve 26 is vulcanized to the inside of a resilient rubber ring 28, which ring is provided with an external groove 29 therein. A plurality of openings 30 extend from the groove 29 through the sleeve 26, while a plurality of openings 31 extend from the chamber 27 through the race 23. The purpose of the openings 30 and 31 is to allow lubricant to flow from around the supporting member to the rollers 24.

In order that the bearing unit may be fixedly secured in the torque tube, I have provided a cylindrical bearing supporting member which is formed of sheet metal and which is provided with a cylindrical flange 32 at one end thereof. An annular inwardly extending stop 33 is formed of the material of the support and is disposed adjacent to the flange 32 with the adjacent center portion 34 of the bearing support having a considerably smaller diameter than the inside diameter of the torque tube. A retaining ridge 35 is formed at the end of the center portion 34 while the end of the supporting member is expanded outwardly to form a second flange 36. The flanges 32 and 36 are spot welded in place to the intermediate portion of torque tube 17, as shown at 37. A lubricating fitting 38 is threaded into the torque tube 17 in alignment with the intermediate portion 34 so that lubricant may be forced into the chamber between the portion 34 and the torque tube 17. A plurality of openings 39 extend through the intermediate portion 34 in line with the groove 29 so that lubricant in the above mentioned chamber may flow through the opening 39 into the groove 29, then through the openings 30 to the chamber 27, and then through the openings 31 to the rollers 24.

The foregoing lubrication passageway has been provided so that the bearing unit may be assembled in any annular position within the bearing member 34, no predetermined alignment of openings therein with the torque tube being required to insure a continuous passageway for the lubricant. It may, however, be desirable to provide means for assembling the bearing unit and support in a predetermined annular position relative to the torque tube in which case the aforementioned annular chambers may be dispensed with.

To assemble the device the bearing support is first moved to position within the torque tube and the flanges 32 and 36 spot welded to the tube. The bearing unit, including the resilient rubber ring 28, is assembled upon a pilot and pushed inwardly from the axle end of the torque tube. When the ring 28 strikes against the ridge 35 it is compressed and upon a further pressure is squeezed past this ridge to position against the stop 33. The free diameter of the rubber ring 28 is somewhat larger than the internal diameter of the portion 34 so that the rubber is frictionally held in position between the stop member 33 and the ridge 35. After the bearing unit has thus been assembled in the torque tube, the drive shaft 21 is inserted through the bearing unit and the tube is then secured to the rear axle housing.

Figure 3 illustrates diagrammatically the difference in function between my improved construction and the conventional type. In the conventional device the drive shaft must be made sufficiently stiff to prevent its whipping at the maximum speed of the motor. Consequently, all drive shafts have hereto rotated upon a straight axis. Such a straight axis is shown in Figure 3 by line 40. The axis of the torque tube when deflected under load is shown by arcuate line 41. It will be noted that the cord 40 intersects the arc 41 at substantially the center of the pinion 16 so that a projection of the axis of the pinion is considerably displaced from the transverse axis through the ring gear. In actual practice this misalignment only amounts to a few thousandths of an inch; nevertheless, this small misalignment changes the loading on the pinion teeth so that only one end of the pinion teeth carries the load. The pinion teeth wear unduly because of misalignment and wear to an arcuate shape along the pitch line. The line contact originally designed into the gearing is thereby destroyed and consequently, noisy gears result.

My improved construction prevents this aforementioned misalignment of the pinion and ring gear for the reason that, when the torque tube 17 deflects, the center portion of the shaft 21 is deflected correspondingly which thereby bows the shaft 21 to the same extent that the torque tube is bowed. Consequently, the axis of rotation of the drive shaft coincides with the axis of the torque tube at all times. Thus, the pinion axis always intersects the transverse axis through the ring gear so that correct alignment of the ring gear and the pinion are maintained under all deflections of the torque tube. The shaft 21 has sufficient elasticity to rotate in this deflected position without fatigue failure.

Some changes may be made in the arrangement, construction and combination of the various parts of my improved device without departing from the spirit of my invention, and it is my intention to cover by my claims, such changes as may reasonably be included in the scope thereof.

I claim as my invention:

1. In a bearing construction adapted to rotatably support the intermediate portion of a drive shaft within a torque tube comprising, a cylindrical supporting member fixed within the intermediate portion of said tube, said supporting member having an inwardly extending stop formed adjacent to one end thereof with an inwardly extending ridge formed adjacent to the other end, a bearing unit adapted to rotatably receive the intermediate portion of said shaft, and a ring of resilient material fixed to the periphery of said bearing unit, said bearing and ring being designed to be forced axially past said ridge into position where said ring with said stop at which time said ring resiliently coacts with said supporting member to retain the unit in position.

2. In a bearing construction adapted to support a drive shaft within a torque tube comprising, a cylindrical bearing supporting member adapted to be fixedly secured within said tube at the center thereof, said cylindrical member having a cylindrical flange at each end thereof of diameters larger than its intermediate portion, said flanges being fixed within the intermediate portion of said tube, whereby an annular chamber is formed between said tube and cylindrical member, an inwardly extending annular stop member formed on said support between one of said flanges and said intermediate portion, an inwardly extending annular ridge formed on said support between the other of said flanges and said intermediate portion, a bearing unit adapted to rotatably receive the center portion of said shaft, and a resilient rubber ring fixed to the periphery of said bearing unit, said ring having an external annular groove therein, and said ring being designed to be forced axially past said ridge into contact with said stop at which time said ring resiliently coacts with said supporting member to retain the unit in position, said bearing, and ring and supporting member having openings therethrough whereby lubricant in said annular chamber may flow through said support, and groove and bearing unit into contact with said shaft.

3. A bearing construction adapted to rotatably support the intermediate portion of a drive shaft within a torque tube comprising, a cylindrical supporting member fixed within the intermediate portion of said tube, said supporting member having a pair of axially-spaced inwardly extending ridges formed thereon, a bearing unit adapted to receive the intermediate portion of said shaft, and a ring of resilient material fixed to the periphery of said bearing unit, said bearing and ring being designed to be forced axially as a unit passed one of said ridges into position between said ridges, in which position said ring resiliently coacts with said supporting member to retain said unit in place.

4. A bearing construction adapted to rotatably support the intermediate portion of a drive shaft within a torque tube comprising, a cylindrical supporting member fixed within the intermediate portion of said tube, said supporting member having an inwardly extending stop formed adjacent to one end thereof, a bearing unit adapted to rotatably receive the intermediate portion of said shaft, and a ring of resilient material fixed to the periphery of said bearing unit, said resilient ring being compressed into position within said cylindrical member adjacent to said stop, for the purpose described.

5. A bearing construction adapted to rotatably support the intermediate portion of a drive shaft within a torque tube comprising, a cylindrical supporting member fixed within the intermediate portion of said tube, a bearing unit adapted to rotatably receive the intermediate portion of said shaft, and a ring of resilient material fixed to the periphery of said bearing unit, said ring being compressed into position within said cylindrical member, there being an annular chamber between said supporting member and said torque tube which forms a lubricant reservoir, and said supporting member and resilient ring, and bearing member having a continuous passage-way therethrough which conducts lubricant from said annular reservoir into the said bearing unit.

NIELS H. F. OLSEN.